United States Patent
Gider et al.

(10) Patent No.: US 12,481,014 B2
(45) Date of Patent: Nov. 25, 2025

(54) HYBRID HALL-EFFECT/MAGNETORESISTANCE (MR) MAGNETOMETER WITH SELF-CALIBRATION

(71) Applicant: Apple Inc., Cupertino, CA (US)

(72) Inventors: Savas Gider, San Jose, CA (US); Jian Guo, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 17/950,748

(22) Filed: Sep. 22, 2022

(65) Prior Publication Data

US 2023/0184865 A1   Jun. 15, 2023

Related U.S. Application Data

(60) Provisional application No. 63/247,711, filed on Sep. 23, 2021.

(51) Int. Cl.
   *G01R 35/00* (2006.01)
   *G01R 33/07* (2006.01)
   *G01R 33/09* (2006.01)

(52) U.S. Cl.
   CPC ........... *G01R 35/005* (2013.01); *G01R 33/07* (2013.01); *G01R 33/09* (2013.01)

(58) Field of Classification Search
   None
   See application file for complete search history.

(56) References Cited

U.S. PATENT DOCUMENTS

| | | | |
|---|---|---|---|
| 2003/0107366 A1* | 6/2003 | Busch | G01D 18/00 324/225 |
| 2011/0234218 A1* | 9/2011 | Lagouge | G01R 33/072 324/252 |
| 2012/0274314 A1* | 11/2012 | Cesaretti | G01R 33/0017 324/252 |
| 2013/0257423 A1* | 10/2013 | Chang | G01R 33/0005 324/251 |
| 2018/0372810 A1* | 12/2018 | Jiang | G01R 33/0035 |
| 2019/0369144 A1* | 12/2019 | Mauder | H10N 50/10 |

OTHER PUBLICATIONS

Yoshida Masanori et al. ; Magnetic Sensor Module; Date Published Jul. 4, 2019; Asahi Kasei Microdevices Corp; WO 2019131816 A1; (Year: 2019).*

* cited by examiner

*Primary Examiner* — Nasima Monsur
(74) *Attorney, Agent, or Firm* — Fish & Richardson P.C.

(57) ABSTRACT

A hybrid Hall/MR magnetometer with self-calibration includes a circuit coupled to a magnetometer and configured to determine whether the magnetometer is to operate in a sensing operation mode or a self-calibration operation mode. The magnetometer comprises a Hall sensor and MR sensor coupled to the circuit. In accordance with determining a sensing operation mode, the Hall sensor is turned off and the MR sensor is turned on; and an external magnetic field is measured using the MR sensor. The magnetic field measurement is calibrated using a MR sensor bias error determined in a self-calibration operation mode of the sensor.

4 Claims, 5 Drawing Sheets

HYBRID HALL-EFFECT/MAGNETORESISTANCE (MR) MAGNETOMETER WITH SELF-CALIBRATION

CROSS-REFERENCE TO RELATED APPLICATION

This application claims priority to U.S. Provisional Patent Application No. 63/247,711, filed Sep. 23, 2021, the entire contents of which are incorporated herein by reference.

TECHNICAL FIELD

This disclosure relates generally to magnetometer architectures.

BACKGROUND

Hall-effect sensors (hereinafter, "Hall sensor") detect the presence and magnitude of a magnetic field using the Hall effect. The Hall effect is when a magnetic field is applied at right angles to the current flow in a thin film where an electric field is generated, which is mutually perpendicular to the current and the magnetic field and which is directly proportional to the product of the current density and the magnetic induction. The magnetic field detected by the Hall sensor is converted to an analog or digital signal that can be used in various applications.

Magnetoresistive (MR) sensors also detect the presence and magnitude of a magnetic field. The MR sensor, however, operates based on the principal that the electrical resistance in a ferromagnetic thin film alloy is changed through an external magnetic field. There are different types of MR sensors, including Anisotropic Magneto Resistance (AMR), Giant Magneto Resistance (GMR) and Tunnel Magneto Resistance (TMR) sensors. The magnetic field detected by the MR sensor is converted to an analog or digital signal that can be used in various applications.

Hall sensors are typically made of non-magnetic semiconductors and thus have a high dynamic range on the order of Tesla. However, Hall sensors also have lower sensitivity and higher noise than MR sensors. In contrast, MR sensors are made with magnetic materials which saturate at low fields (milliTesla) and can have hysteresis.

SUMMARY

Embodiments are disclosed for a hybrid Hall/MR magnetometer (hereinafter referred to as "hybrid sensor"). A magnetometer is a device that can sense a magnetic field from an external environment, such as, for example, sensing electromagnetic fields emitted from active transmitters. Magnetometers are often used as magnetometer sensors for mobile devices, such as smartphones, smartwatches and the like. The disclosed hybrid sensor is a 3-axis magnetometer that combines a monolithically integrated 3-axis Hall sensor with an application specific integrated circuit (ASIC) and a 3-axis MR sensor into a single integrated circuit (IC) package to leverage the high dynamic range of the Hall effect element and the high sensitivity of the MR element.

The hybrid sensor can detect direct current (DC) magnetic fields with high sensitivity and low noise and can also detect high DC magnetic fields. The hybrid sensor can also detect alternating current (AC) magnetic fields in the presence of a large DC magnetic field. The hybrid sensor has a sensing operation mode and a self-calibration operation mode. In the sensing operation mode, the Hall sensor is turned off and the MR sensor is active and measures Earth's magnetic field with high precision, low noise and low power performance. In the self-calibration operation mode, both the Hall sensor and the MR sensor are turned on, and a MR sensor bias error is calibrated based on the Hall sensor reference and stored in, for example, memory of an application specific integrated circuit (ASIC) of a digital signal processor (DSP) chip.

In an embodiment, an integrated circuit arrangement for a magnetometer, comprises: an integrated circuit; a die disposed on the integrated circuit; a Hall sensor and magnetoresistance (MR) sensor disposed on the die; and conductive paths electrically connecting output terminals of the Hall sensor and the MR sensor to the integrated circuit.

In an embodiment, an integrated circuit arrangement for a magnetometer, comprises: an integrated circuit; a Hall sensor and magnetoresistance (MR) sensor disposed on the integrated circuit; and conductive paths electrically connecting output terminals of the Hall sensor and the MR sensor to the integrated circuit.

In an embodiment, an integrated circuit arrangement for a magnetometer, comprises: an integrated circuit; a die disposed on the integrated circuit; a Hall sensor disposed on the die; a magnetoresistance (MR) sensor disposed on the integrated circuit; and conductive paths electrically connecting output terminals of the Hall sensor and the MR sensor to the integrated circuit.

In an embodiment, an integrated circuit arrangement for a magnetometer, comprises: an integrated circuit; a die disposed on the integrated circuit; a magnetoresistance (MR) sensor Hall disposed on the die; a Hall sensor disposed on the integrated circuit; and conductive paths electrically connecting output terminals of the Hall sensor and the MR sensor to the integrated circuit.

In an embodiment, a method comprises: a circuit coupled to a magnetometer and configured to determine whether the magnetometer is to operate in a sensing operation mode or a self-calibration operation mode, the magnetometer comprising a Hall sensor and MR sensor coupled to the circuit; in accordance with determining a sensing operation mode: turning off the Hall sensor; turning on the MR sensor; and measuring an external magnetic field using the MR sensor; calibrating the measurement of the external magnetic field using a MR sensor bias error; in accordance with determining the self-calibration operation mode: turning on the Hall sensor and the MR sensor; measuring Hall sensor output measuring MR sensor output; determining the MR sensor bias error based on a difference between the Hall sensor output and the MR sensor output; and storing the MR sensor bias error for use during the sensing operation mode.

Particular embodiments disclosed herein provide one or more of the following advantages. The disclosed hybrid sensor detects low and high DC magnetic fields with high sensitivity and low noise and AC magnetic fields in the presence of large DC magnetic fields. The hybrid sensor enables ultra-low absolute offset shift (<1 µTesla) post magnetization, thus providing a magnetometer sensor that is less dependent on software calibration to deliver accurate device headings. The disclosed hybrid sensor is well-suited for magnetic tracking and fingerprinting for localization and also for measuring Earth's magnetic field for navigation applications.

The details of one or more implementations of the subject matter are set forth in the accompanying drawings and the description below. Other features, aspects and advantages of the subject matter will become apparent from the description, the drawings and the claims.

DETAILED DESCRIPTION

Figure 1A:
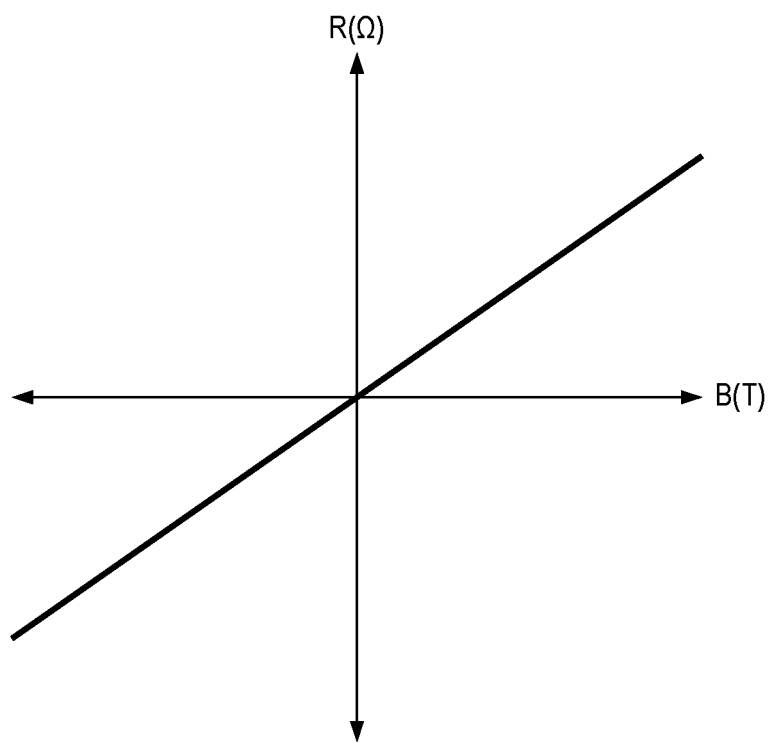
FIG. 1A illustrates a typical response of a Hall sensor to an external magnetic field.

FIG. 1A illustrates a typical response of a Hall sensor to an external magnetic field. As shown in FIG. 1A, the resistance R ($\Omega$) increases linearly with the magnetic field B (T) and has a high dynamic field range on the order of Tesla (T). The high dynamic range is a result of using non-magnetic semiconductors in the fabrication of the Hall sensor. The Hall sensor, however, has a lower sensitivity and higher noise than MR sensors.

Figure 1B:
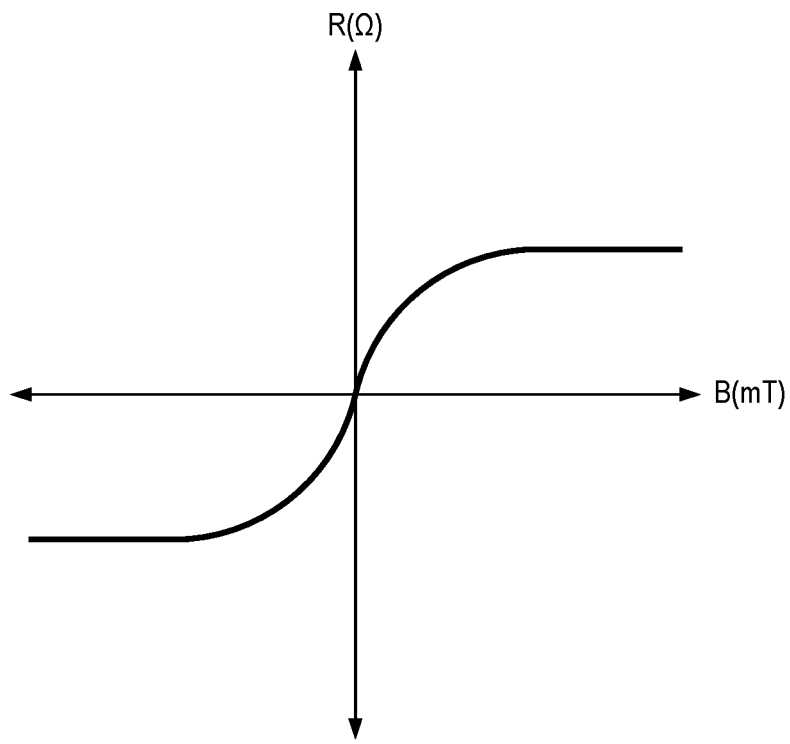
FIG. 1B illustrates a typical response of a MR sensor to an external magnetic field.

FIG. 1B illustrates a typical response of a MR sensor to an external magnetic field. As shown in FIG. 1B, the resistance R ($\Omega$) saturates at low magnetic fields B (mT) and may have hysteresis. The saturation at low fields is a result of using magnetic metals in the fabrication of the MR sensor. The MR sensor, however, has higher sensitivity and lower noise than the Hall sensor.

It is desired to have a magnetic field sensor with high dynamic range, high sensitivity and low noise that can detect low DC magnetic fields. It is further desired to have a magnetic sensor that can detect AC magnetic fields in the presence of a large DC magnetic field. FIGS. 2 and 3 illustrate various integrated circuit (IC) arrangements for a hybrid magnetic sensor that includes a Hall sensor and an MR sensor that can achieve this design goal.

Figure 2A:
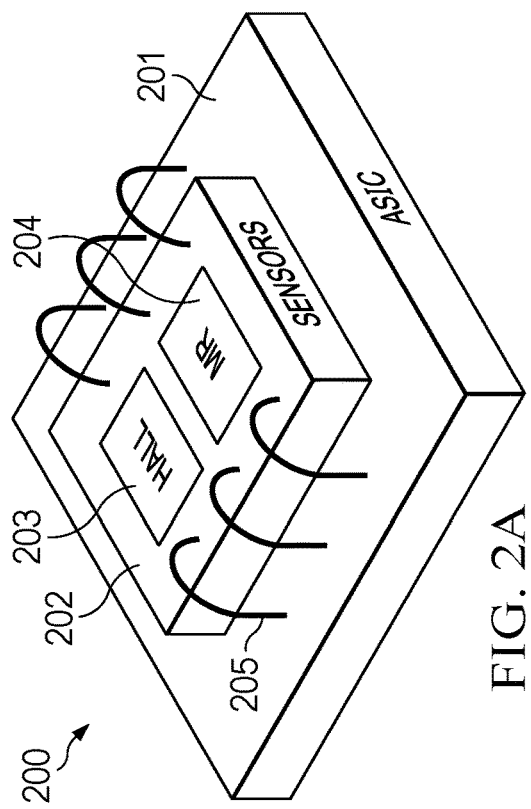
FIG. 2A is a perspective view of Hall and MR sensors fabricated on a different die of an ASIC, according to an embodiment.

FIG. 2A is a perspective view of a magnetometer with Hall and MR sensors fabricated on a different die of an ASIC, according to an embodiment. Magnetometer 200 includes ASIC 201, die 202, Hall sensor 203 and MR sensor 204. Hall sensor 203 and MR sensor 204 are fabricated on die 202. Conductive paths, such as wire bonds 205, connect the outputs of the sensors 203, 204 to ASIC 201. Hall sensor 203 can detect magnetic fields far beyond the saturation field of MR sensor 204. Thus, Hall sensor 203 can trigger MR sensor 204 to reset if there has been exposure to a large field.

Figure 2B:
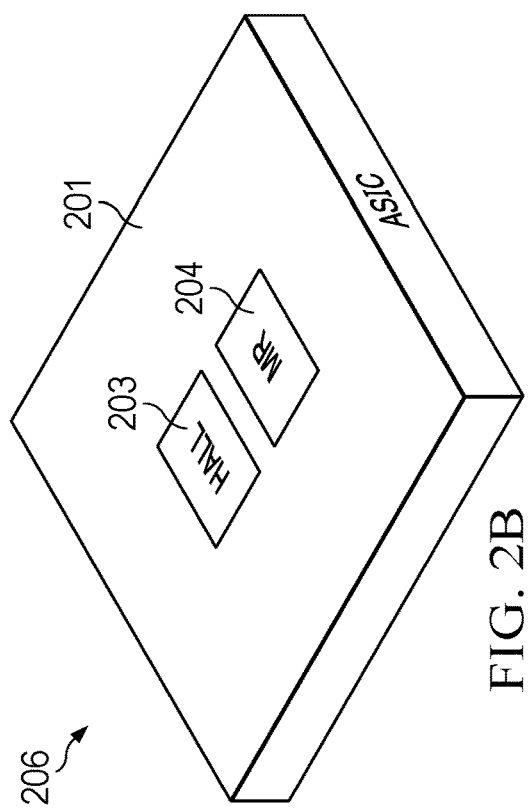
FIG. 2B is a perspective view of Hall and MR sensors fabricated on the same die as the ASIC, according to an embodiment.

FIG. 2B is a perspective view of a magnetometer with Hall and MR sensors fabricated on the same die as the ASIC, according to an embodiment. Magnetometer 206 includes ASIC 201, Hall sensor 203 and MR sensor 204. Hall sensor 203 and MR sensor 204 are fabricated on ASIC 201.

Figure 3A:
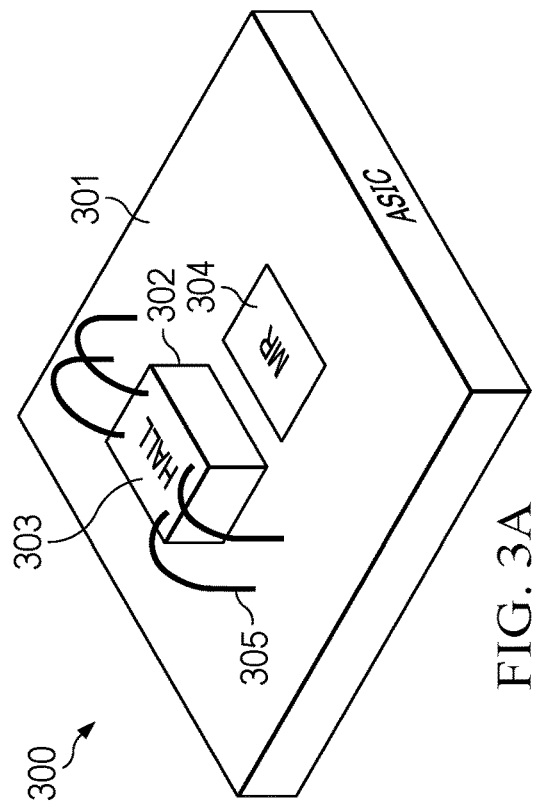
FIG. 3A is a perspective view of a Hall sensor fabricated on a separate die from the ASIC and MR sensor, according to an embodiment.

FIG. 3A is a perspective view of a magnetometer with a Hall sensor fabricated on a separate die from the ASIC and MR sensor, according to an embodiment. Magnetometer 300 includes ASIC 301, die 302, Hall sensor 303 and MR sensor 304. Hall sensor 303 is fabricated on die 302. Conductive paths, such as wire bonds 305 connect the outputs of Hall sensor 203 to ASIC 201.

Figure 3B:
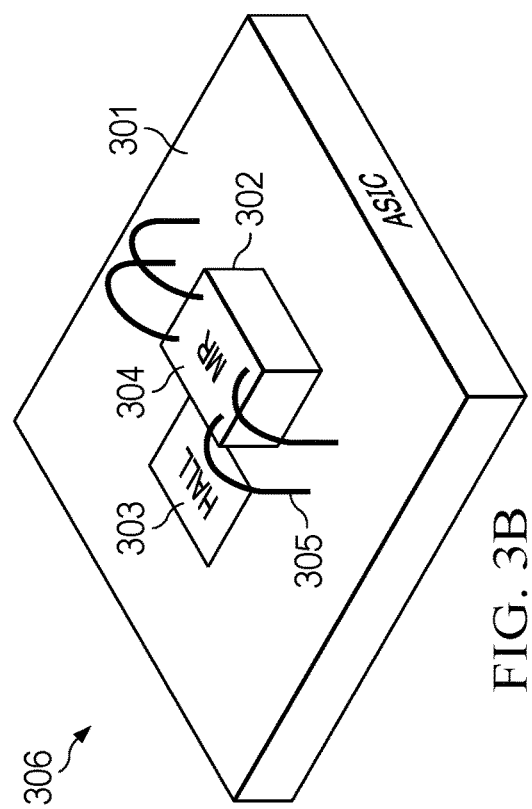
FIG. 3B is a perspective view of a MR sensor fabricated on a separate die from the ASIC and Hall sensor, according to an embodiment.

FIG. 3B is a perspective view of a magnetometer with an MR sensor fabricated on a separate die from the ASIC and Hall sensor, according to an embodiment. Magnetometer 300 includes ASIC 301, die 302, Hall sensor 303 and MR sensor 304. MR sensor 304 is fabricated on die 302. Conductive paths, such as wire bonds 305 connect the outputs of MR sensor 304 to ASIC 201.

Magnetometer 200, 206, 300 and 306 can be installed into an IC package (e.g., a separate chip or system on chip (SoC)) for integration into a printed circuit board of an electronic device, such as a smartphone or smartwatch. The Hall sensor and MR sensor can include circuitry for converting changes in film resistance to voltages using, for example, a Wheatstone bridge circuit configuration. The voltages are then processed by the ASIC to generate a measurement of an external magnetic field, such as magnetic fields generated by active transmitters or Earth's magnetic field. In an embodiment, the ASIC includes circuitry for turning the Hall sensor and MR sensor on and off, independently, based on whether the magnetometer is in a sensing operation mode or a self-calibration operation mode, as described in reference to FIG. 7. Magnetometers 200, 206, 300, 306 are for sensing an external magnetic field on a single axis. In other embodiments, three single axis magnetometers can be packaged orthogonally to each other to implement a 3-axis magnetometer.

The operation mode of the magnetometer can be selected by, for example, an application processor (not shown) of an electronic device in which magnetometer is embedded. For example, the ASIC can be coupled to the application processor through conductive paths (e.g., traces, wire bonds, conductive vias) of a printed circuit board (PCB). Applicant processor can further process the magnetic field measurements for magnetic localization and fingerprinting applications, to generate a compass heading that can be used by other applications on the electronic device, such as navigation applications, or for any other desired application.

Figure 4:
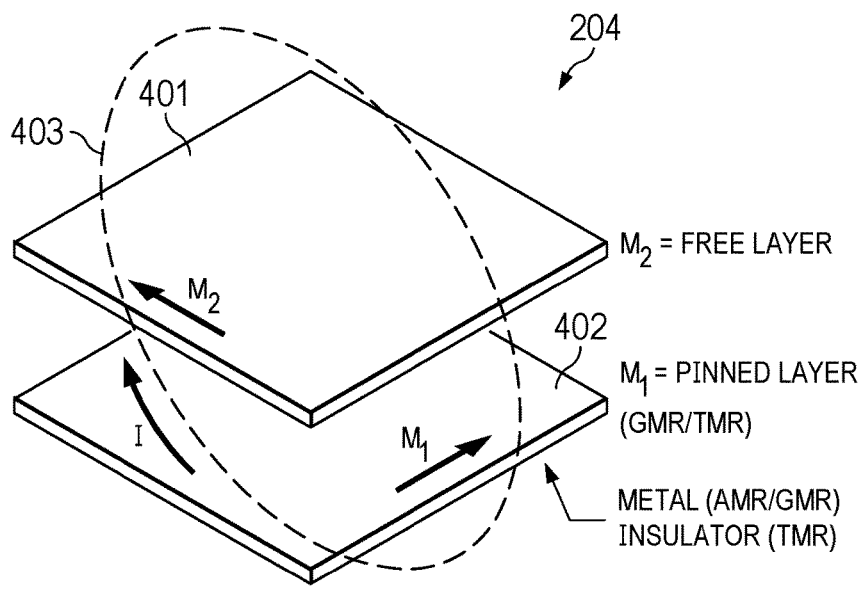
FIG. 4 illustrates an MR sensor that is designed to respond to the same magnetic field direction as a corresponding Hall sensor, according to an embodiment.

FIG. 4 illustrates an MR sensor that is designed to respond to the same magnetic field direction as a corresponding Hall sensor, according to an embodiment. MR sensor 204 comprises a thin film structure composed of a non-magnetic metal insulator layer (not shown) sandwiched between two magnetic metal layers 401 (M2), 402 (M1). The resistance R of these stacked layers changes depending on the relative orientation of magnetization of the two magnetic layers 401, 402. Magnetic metal layer 402 is fabricated to have a fixed direction of magnetization and is called a "pinned" (or reference) layer. Magnetic metal layer 401 is called a "free" layer and is made of a soft magnetic material. The direction of magnetization of magnetic metal layer 401 rotates under the influence of an applied magnetic field.

Figure 5A:
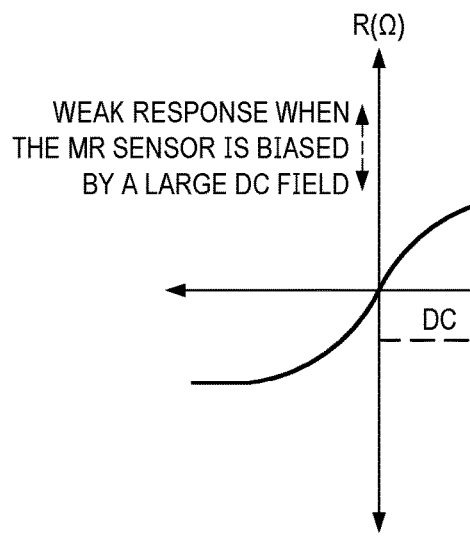
FIG. 5A illustrates an AC response of an MR sensor in the presence of a large DC field, according to an embodiment.

Some applications may need to sense a small AC magnetic field in the presence of a large DC magnetic field. The MR sensor should have a high sensitivity, i.e., a large change in resistance R for a given change in magnetic field B. However, a high sensitivity leads to a low saturation field. A large DC magnetic field may saturate the MR sensor and give a small AC response. FIG. 5A illustrates an AC response of an MR sensor in the presence of a large DC field, according to an embodiment. As can be observed from FIG. 5A, there is a weak response to the external magnetic field when the MR sensor is biased by a large DC field.

Figure 5B:
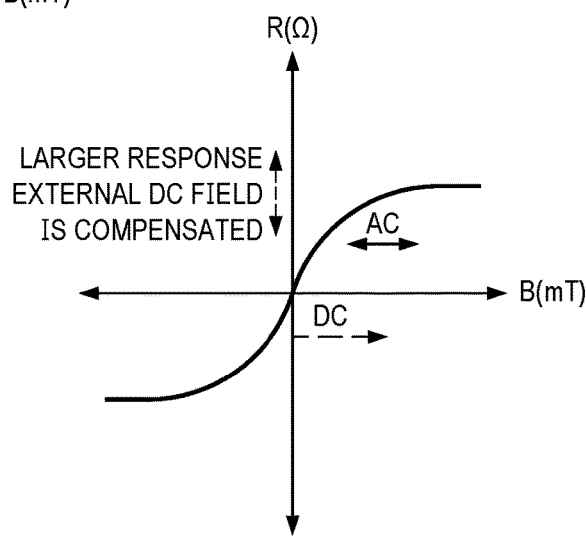
FIG. 5B illustrates and AC response of the MR sensor in the presence of a smaller DC field, according to an embodiment.

Since Hall sensors do not saturate they can be used to measure the DC magnetic field. To compensate for the large DC magnetic field, a current is applied to compensation coil 403 around the MR sensor (see FIG. 4) to cancel or reduce the DC magnetic field to give a linear response to the AC magnetic field. The compensation coil would be applied on a per axis basis, i.e., a separate compensation coil for each of the x, y and z sensors of the 3-axis MR sensor. FIG. 5B illustrates the AC response of the MR sensor in the presence of the smaller DC field due to the compensation coils 403, according to an embodiment.

Figure 6:
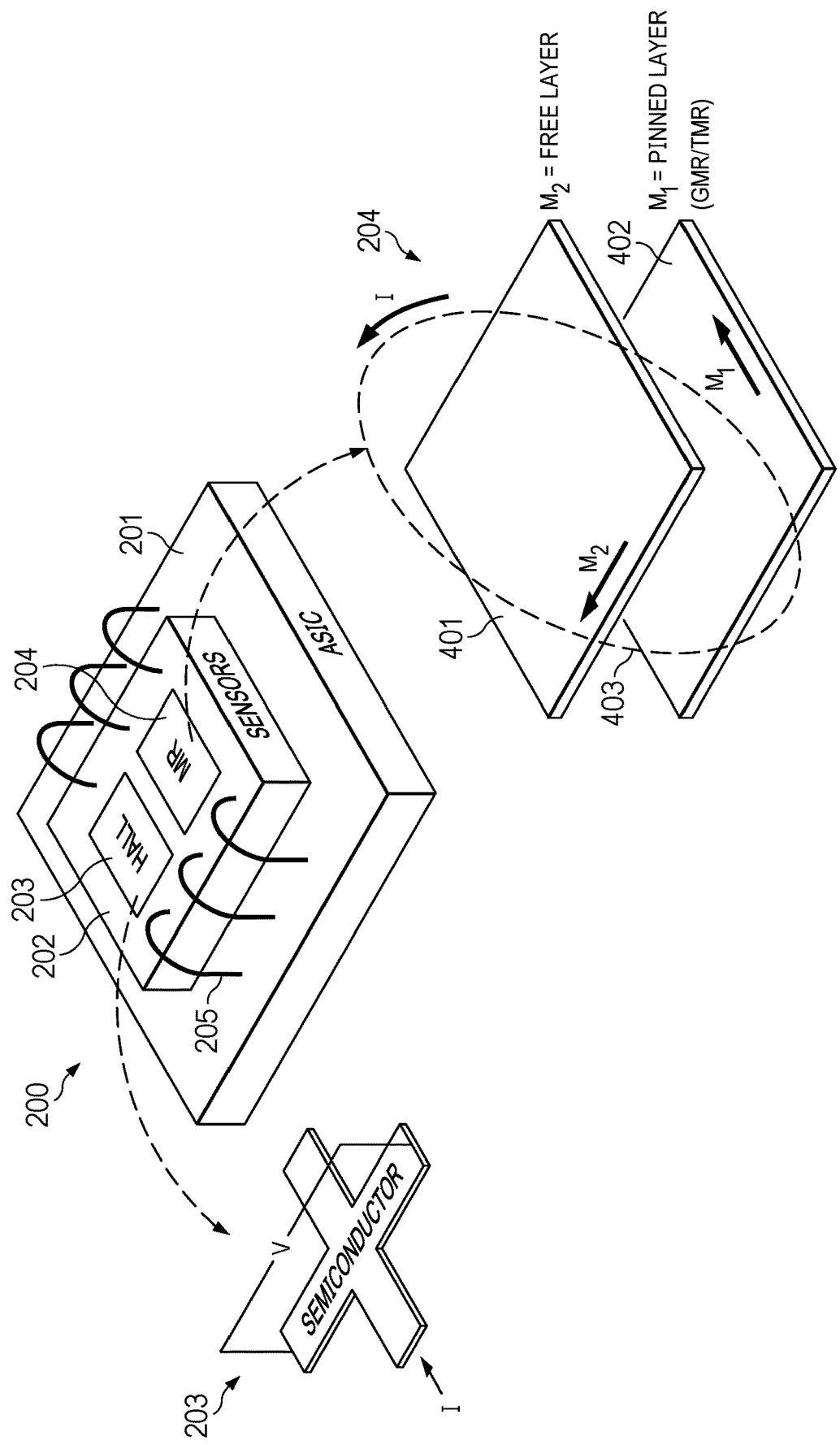
FIG. 6 illustrates a magnetometer including the features described in reference to FIGS. 1-5, according to an embodiment.

FIG. 6 illustrates a magnetometer including the features described in reference to FIGS. 1-5, according to an embodiment. Magnetometer 200 includes Hall sensor 203 and MR sensor 204 fabricated on die 202. Wirebonds 205 connect sensors 203, 205 to ASIC 201. MR sensor 204 includes magnetic metal layers 401, 402 and compensation coil 403. Hall sensor 203 detects DC and AC magnetic fields. Large DC magnetic fields detected by Hall sensor 203 causes ASIC 201 to generate a control signal to a current driver to drive current into compensation coil 403 to cancel or reduce the large DC magnetic field, thereby allowing MR sensor 204 to measure small AC magnetic fields without saturating.

The configuration of magnetometer 200 (and the other configurations shown in FIGS. 2 and 3) provide a hybrid 3-axis magnetometer that comprises a monolithically integrated 3-axis Hall sensor with ASIC and a 3-axis MR sensor element in a single IC package. The Hall sensor detects DC and AC magnetic fields. The MR sensor detects low AC magnetic fields. When the Hall sensor detects a large DC magnetic field, the ASIC driver current into a compensation coil surrounding the MR sensor to cancel or reduce the large DC magnetic field, thus allowing the MR sensor to measure small AC magnetic fields without saturating.

Figure 7:
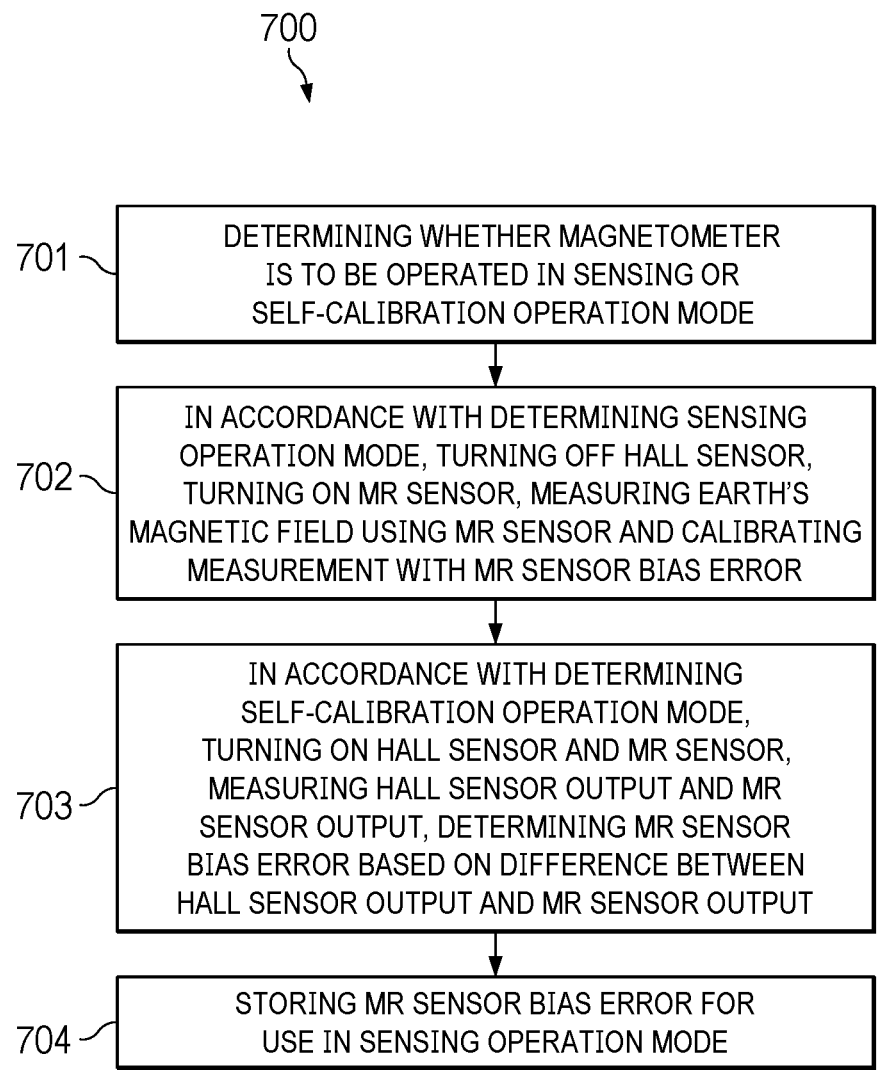
FIG. 7 is a flow diagram of a process performed by a hybrid sensor, according to an embodiment.

FIG. 7 is a flow diagram of a process 700 performed by the hybrid sensor, according to an embodiment. Process 700 can be implemented by, for example, an ASIC alone or in combination with an application processor.

Process 700 begins by determining whether a hybrid magnetometer is to be operated in a sensing or self-calibration operation mode (701). For example, an application processor can generate a signal can be used by an ASIC of the hybrid magnetometer to change between sensing and self-calibration operation modes.

In accordance with determining a sensing operation mode, the ASIC turns off the Hall sensor and turns on the MR sensor to measure the external magnetic field, which is calibrated by a MR sensor bias error (702).

In accordance with determining a self-calibration operation mode, the ASIC turns on the Hall sensor and the MR sensor, samples the outputs of the Hall sensor and MR sensor and computes a difference between the outputs as the MR sensor bias error (703). The ASIC then stores the MR sensor bias error (e.g., in ASIC memory) for use in calibrating the measurement of the external magnetic field during the sensing mode of operation.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. An integrated circuit arrangement for a magnetometer, comprising:
    an integrated circuit;
    a die disposed on the integrated circuit;
    a Hall sensor and magnetoresistance (MR) sensor disposed on the die, the Hall sensor configured to measure a direct current (DC) magnetic field;
    conductive paths electrically connecting output terminals of the Hall sensor and the MR sensor to the integrated circuit;
    circuitry for turning the Hall sensor off and the MR sensor on in a sensing operation mode and turning both the Hall sensor and the MR sensor on in a self-calibration operation mode, wherein the self-calibration operation mode is triggered when the Hall sensor detects that the DC magnetic field is beyond a saturation field of the MR sensor;
    a compensation coil surrounding the MR sensor; and
    a current driver for driving current into the compensation coil during the sensing operation mode to cancel or reduce the measured DC magnetic field thereby allowing the MR sensor to measure alternating current (AC) magnetic fields without saturating.

2. The integrated circuit arrangement of claim 1, wherein the integrated circuit includes the current driver and the current driver is configured to drive current into the compensation coil in response to a control signal generated by the integrated circuit in response to detection of the DC magnetic fields by the Hall sensor.

3. The integrated circuit arrangement of claim 1, wherein at least one of the Hall sensor or the MR sensor includes a Wheatstone bridge circuit configuration for converting changes in film resistance to voltages.

4. The integrated circuit arrangement of claim 1, wherein the integrated circuit arrangement is included in an integrated circuit package, and the integrated circuit arrangement is configured to sense a magnetic field in three orthogonal axes.

\* \* \* \* \*